United States Patent [19]
Diaconu

[11] Patent Number: 6,160,607
[45] Date of Patent: Dec. 12, 2000

[54] CAMERA FOCUS INDICATOR

[76] Inventor: Dan Mugur Diaconu, #110-225 West 3rd Street, North Vancouver, British Columbia, Canada, V7M 1E9

[21] Appl. No.: 09/087,802

[22] Filed: Jun. 1, 1998

[51] Int. Cl.⁷ .................................................. G03B 3/00
[52] U.S. Cl. ........................................... 352/140; 352/139
[58] Field of Search .................................... 352/139, 140, 352/57, 93, 94, 133; 348/345–357, 169; 396/138–143, 149, 374, 89, 79, 80, 82, 93, 94

[56] References Cited

U.S. PATENT DOCUMENTS

| | | | |
|---|---|---|---|
| 2,202,593 | 5/1940 | Moreau et al. | 396/141 |
| 3,661,064 | 5/1972 | Norris | 396/139 |
| 3,957,355 | 5/1976 | Reinsch et al. | 359/705 |
| 4,114,994 | 9/1978 | Kondo | 352/139 |
| 4,123,765 | 10/1978 | Isono | 396/117 |
| 4,156,563 | 5/1979 | Kato et al. | 396/101 |
| 4,290,693 | 9/1981 | Stein | 356/3.15 |
| 4,371,240 | 2/1983 | Shimizu et al. | 352/140 |
| 4,534,629 | 8/1985 | Bogle et al. | 352/140 |
| 4,591,257 | 5/1986 | Sawano | 396/111 |
| 4,601,557 | 7/1986 | Bogle et al. | 352/140 |
| 4,692,006 | 9/1987 | Rice et al. | 396/374 |
| 5,092,670 | 3/1992 | Preston | 352/140 |
| 5,140,414 | 8/1992 | Mowry | 348/577 |
| 5,142,299 | 8/1992 | Braun | 354/64 |
| 5,142,642 | 8/1992 | Sudo | 348/47 |
| 5,175,616 | 12/1992 | Milgram et al. | 348/47 |
| 5,453,840 | 9/1995 | Parker et al. | 356/400 |
| 5,493,638 | 2/1996 | Hooper et al. | 345/435 |
| 5,552,823 | 9/1996 | Kageyama | 348/155 |
| 5,636,211 | 6/1997 | Newlin et al. | 370/465 |
| 5,682,198 | 10/1997 | Katayama et al. | 348/47 |
| 5,798,791 | 8/1998 | Katayama et al. | 348/218 |
| 5,801,760 | 9/1998 | Uomori | 348/47 |
| 5,949,477 | 9/1999 | Hoglin | 348/47 |

*Primary Examiner*—Russell Adams
*Assistant Examiner*—Rodney Fuller

[57] ABSTRACT

A focus indicator system for a motion picture camera has video cameras mounted on opposite sides of the motion picture camera. Images produced by the video cameras are superimposed on the screen of a monitor. The video cameras are rotatable, and rotate in responses to changes in the focus of the lens. Movements of the lens' focus ring are detected by a transducer. A control circuit monitors the output from the transducer and operates a motor, which rotates the video cameras in opposite senses. The optical axes of the video cameras cross in the plane in which the lens is focused. The person operating as first assistant camera can determine when the motion picture camera is in focus by viewing the monitor. When an object is in focus, the superimposed images from the video cameras coincide. When the object is not in focus the superimposed images are separated. The focus indicator helps the person who is focussing the camera to rapidly and accurately focus on objects in the camera's field of view. This reduces re-takes caused by inaccurate focusing and makes set up faster. This reduces production costs.

10 Claims, 11 Drawing Sheets

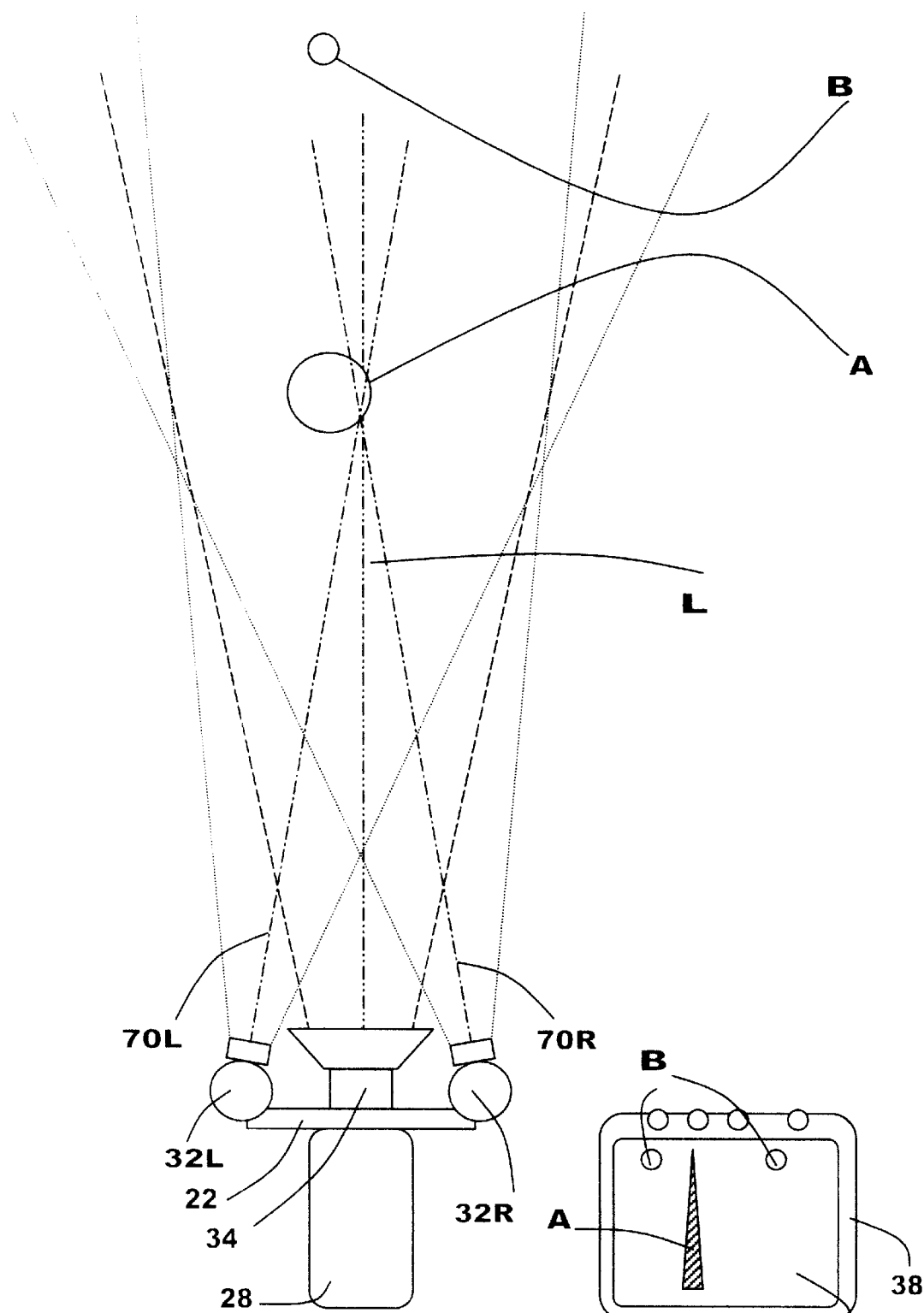

CAMERA FOCUS INDICATOR

BACKGROUND OF THE INVENTION

1. Field of the Invention

This invention relates in general to focus indicator systems for use with motion picture cameras. The invention relates specifically to a focus indicator system which uses parallax to indicate when an object in the field of view of a motion picture camera is in focus.

2. Description of the Related Art

Maintaining a properly focused image is critically important in film and television productions. This task is complicated by the fact that many shots require a moving object to be kept in focus or require different objects at different distances from the camera to be in focus at different times during the shot. Typically, on a movie set, the person responsible for focusing the camera, who is called the "first assistant camera" prepares for each shot by carefully measuring the distance to each object which will be in focus during the shot and then carefully marking the focusing ring on the camera lens with the measured distances. During the shot the first assistant camera adjusts the focusing ring to bring each object into precise focus at the desired time. This method works well with immobile objects. If the camera or the elements to be photographed are in motion it becomes very difficult to maintain the proper focus. Furthermore, this method is time consuming. The first assistant camera must make careful measurements before each shot. The enormous costs of production creates a need for a quick means for maintaining focus during a shot.

The prior art discloses a number of ways to maintain focus in a movie camera. U.S. Pat. No. 5,092,670 to Preston discloses an automatic focusing system for use with a motion picture camera. This system incorporates a laser range finder and triangulation to determine the distance to the object and adjusts the camera lens accordingly. The laser range finder is mounted on a tripod that is a fixed distance from the camera. While this system is useful for tracking moving objects, it is not practical for use with a moving camera. Where wide angle lenses are used in tight quarters it may be difficult to keep the range finder out of the field of view of the camera. Finally the system requires an operator for the range finder. This adds to the cost of filming.

Shenk, U.S. Pat. No. 4,531,822 discloses an auto-focussing camera incorporating an object presence detecting transducer. The camera automatically focuses on objects within its sonic acceptance angle. The Shenk device does not enable a user to focus on one of several objects within the acceptance angle or to shift the focus between different objects in the sonic acceptance angle.

Bogle et al., U.S. Pat. Nos. 4,601,557 and 4,534,629 disclose motion picture cameras having automatic focusing systems. The cameras uses microwave transmitters to transmit signals to targets wearing reactive signal generators. These systems require the objects of focus to wear a signal generator. This is not always practical, for instance when shooting nature documentaries.

Some prior art auto-focus systems include a partially silvered mirror, or the like, which intercepts some of the light passing through the lens of a motion picture camera. Such systems are undesirable because they degrade the optical path. In cinematography it is important to maintain the highest quality optical path possible.

One can compensate somewhat for inaccurate focussing by using a small lens aperture to increase the depth of field of the motion picture camera. This can be undesirable, especially when shooting at night, because a small lens aperture reduces the amount of light that passes through the lens. Using a small lens aperture can make it necessary to provide supplementary illumination. This adds expense and increases the time needed to set up for a shoot.

What is needed is a focus indicator system for a motion picture camera that will allow the person responsible for focusing the camera to quickly verify that a selected object is in precise focus. There is a particular need for such a device that can work with existing camera lenses and cameras.

SUMMARY OF THE INVENTION

This invention provides a focus indicator system for a primary camera. The focus indicator comprises a frame attachable to a primary camera. First and second video cameras are pivotally mounted to the body at spaced apart locations. The video cameras can counter rotate about parallel first and second axes respectively. The first and second video cameras have optical axes which cross one another at a point in front of the camera. A signal combiner is connected to receive first and second video signals from the first and second video cameras and to output a combined video signal containing first and second images from the first and second video cameras to a monitor. The monitor has a screen and is connected to receive the combined video signal and to display the first and second images on the screen. The first and second video cameras may be coupled by a coupling to a focus ring on a camera to counter rotate in response to rotation of the focus ring to maintain the crossing point at the distance for which the camera is focused. In one embodiment, when the frame is attached to a primary camera, the first video camera is mounted on a first side of the primary camera and the second video camera is mounted on a second side of the motion picture camera.

The coupling between the lens and the video cameras preferably comprises an electro-mechanical coupling. Most preferably the coupling comprises a transducer engageable with the focus ring, a control circuit to receive signals from the transducer which indicate the change of position of the focus ring in relation to the focus ring's position when the focus distance is set to infinity, a motor controlled by the control circuit, and a linkage driving counter rotation of the video cameras in response to operation of the motor. Preferably the linkage comprises a cross shaft driven by the motor and each camera is mounted on a shaft extending generally perpendicularly to the cross shaft and coupled to the cross shaft by a bevel gear.

Most preferably the cross shaft is telescopic and the first and second video cameras are adjustably movable toward and away from one another.

Another aspect of the invention provides a focus indicator for a motion picture camera having a lens. The focus indicator comprises: first and second video cameras pivotally mounted on either side of the lens for counter rotation about parallel first and second axes respectively, the first and second video cameras having optical axes; a transducer operatively associated with the lens, the transducer providing an output indicative of a position at which the lens is focused; control means connected to the transducer for counter rotating the video cameras in response to the transducer output so that the optical axes cross at the position; a video mixer connected to receive first and second video signals from the first and second video cameras and to output a combined video signal containing first and second images from the first and second video cameras; and, a monitor having a screen, the monitor connected to receive the combined video signal and to display simultaneously the first and second images on the screen.

Yet another aspect of the invention provides a method for indicating when a lens of a motion picture camera is focused on an object. The method comprises the steps of: providing a focus indicator comprising first and second video cameras mounted on opposed sides of a lens of a motion picture camera; in response to rotation of a focus ring on the lens, pivoting the first and second video cameras about parallel axes so that optical axes of the first and second video cameras cross at a distance in front of the lens equal to the focus distance of the lens; and, simultaneously displaying on a monitor screen first and second images of an object as viewed by the first and second video cameras respectively. The movement of the video cameras is correlated during initial setup with movement of the focus ring. Once this correlation is done, focus is achieved by adjusting the focus ring until the first and second images on the video screen coincide. Preferably the step of providing the focus indicator comprises mounting the first video camera on a first side of the motion picture camera and mounting the second video camera on a second side of the motion picture camera.

BRIEF DESCRIPTION OF THE DRAWINGS

In drawings which illustrate specific embodiments of the invention, but which should not be construed as restricting the spirit or scope of the invention in any way:

FIG. 7B is a top plan schematic view of a motion picture camera equipped with a focus indicator wherein the focus distance is set at infinity;

DETAILED DESCRIPTION

Figure 1:
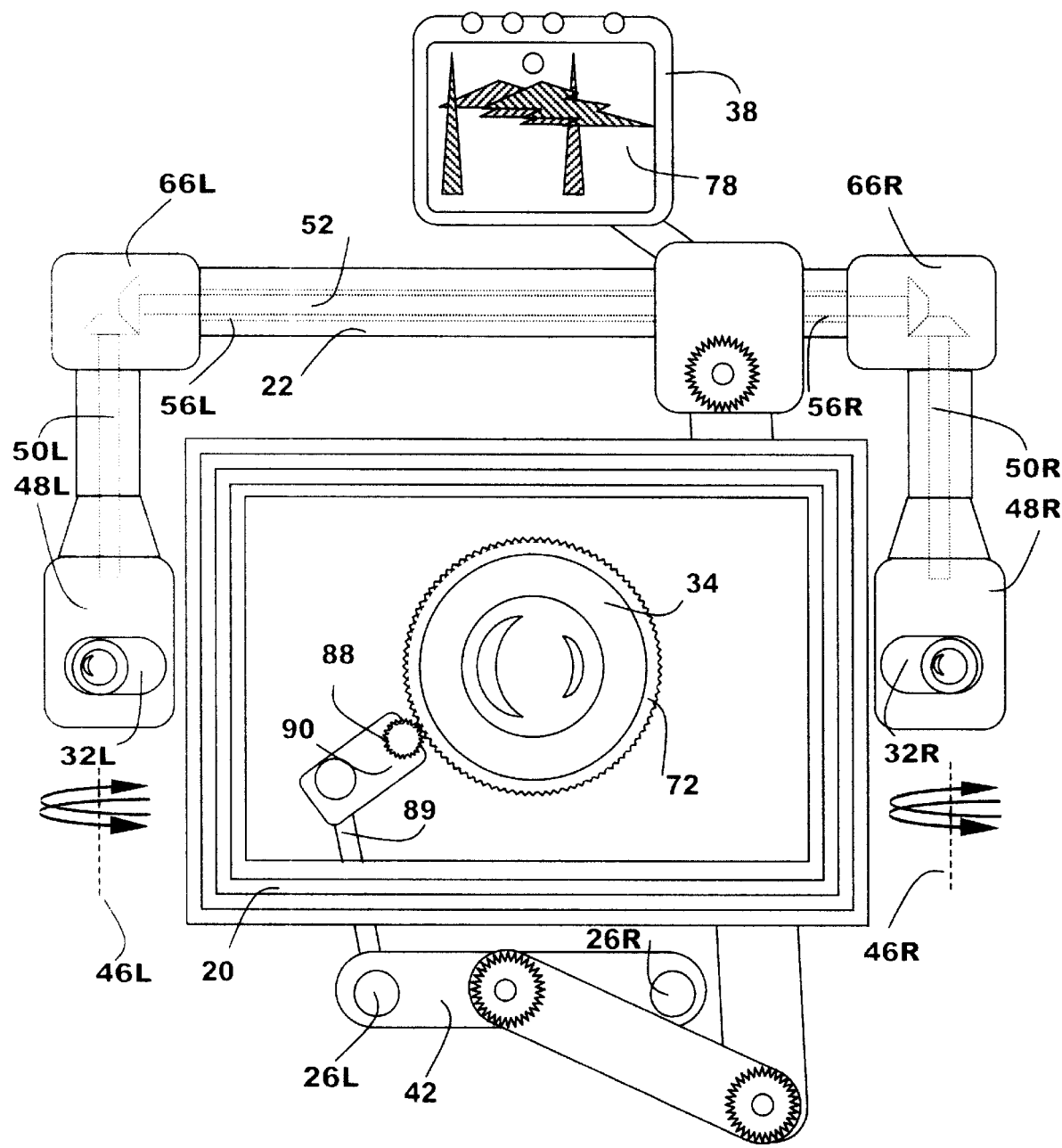
FIG. 1 is a partially schematic front perspective view of a motion picture camera equipped with a focus indicator according to the invention.
Figure 2:
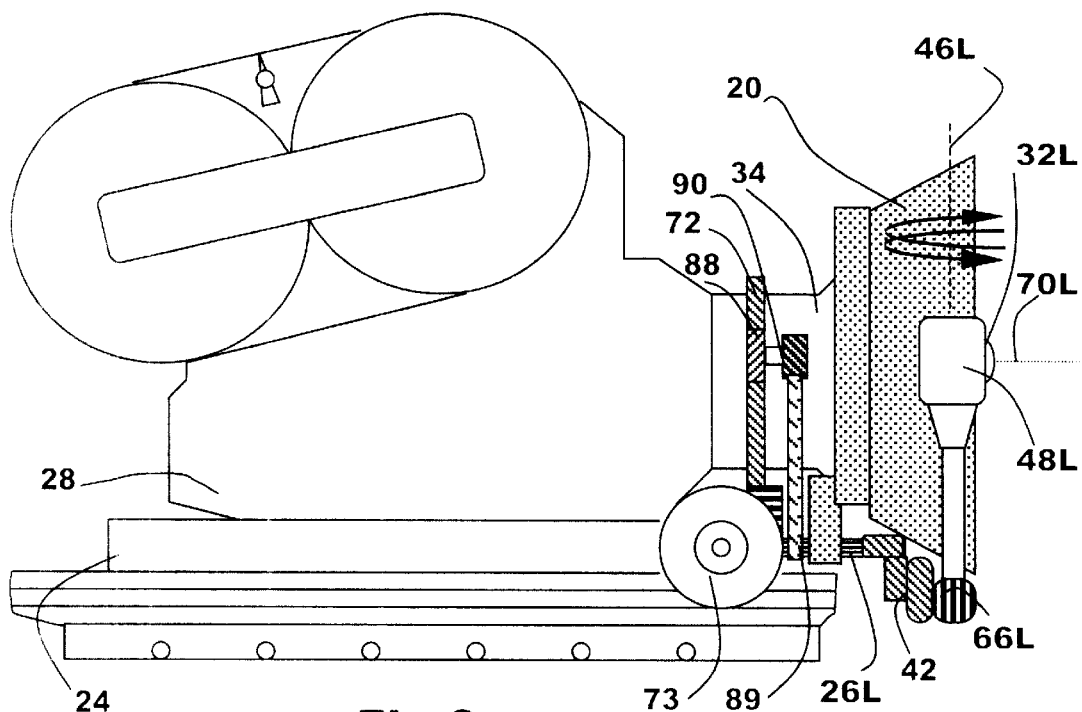
FIG. 2 is a side view thereof.

FIG. 1 shows a front view of a motion picture camera system equipped with a focus indicator 22 according to the invention. In FIG. 1 the camera itself is hidden behind a matte box 20. The camera 28 can be seen in FIG. 2. Matte box 20 is typically slidably mounted on a plate 24 which is mounted on rods 26. The distance of matte box 20 from motion picture camera 28 (FIG. 2) can be precisely adjusted to accommodate different lens lengths, focus or zoom motors, etc. While focus indicator 22 may be used with any type of motion picture camera, camera 28 is preferably a professional motion picture camera as is used in cinematography. Camera 28 has a lens 34 which includes a focus ring 72 for adjusting the distance at which it is focussed. A separate focus knob 73 may be coupled to focus ring 72 so that focus ring 72 can be easily adjusted.

Focus indicator 22 comprises a pair of video cameras 32R and 32L (collectively, cameras 32) which are pivotally mounted on the right and left sides of lens 34 of camera 28 respectively. Video cameras 32 are preferably compact and lightweight. Video cameras 32 preferably are capable of creating images for display on monitor 38 under low light conditions. Each of video cameras 32R and 32L is pivoted equally by a control means as the focus of lens 34 of camera 28 is adjusted by rotating focus ring 72. Cameras 32 are pivoted so that their optical axes cross on the optical axis L of lens 34. Cameras 32L and 32R have suitable power supplies of conventional construction which are not shown for clarity.

Images from each of video cameras 32R and 32L are carried through wires (not shown for clarity) to a video mixer 36. The output from video mixer 36 is carried to a monitor 38. The result is that images from each of video cameras 32 is simultaneously displayed on monitor 38. The first assistant camera can tell whether a particular object is in focus by viewing the images displayed on monitor 38 as is described in more detail below.

Figure 3:
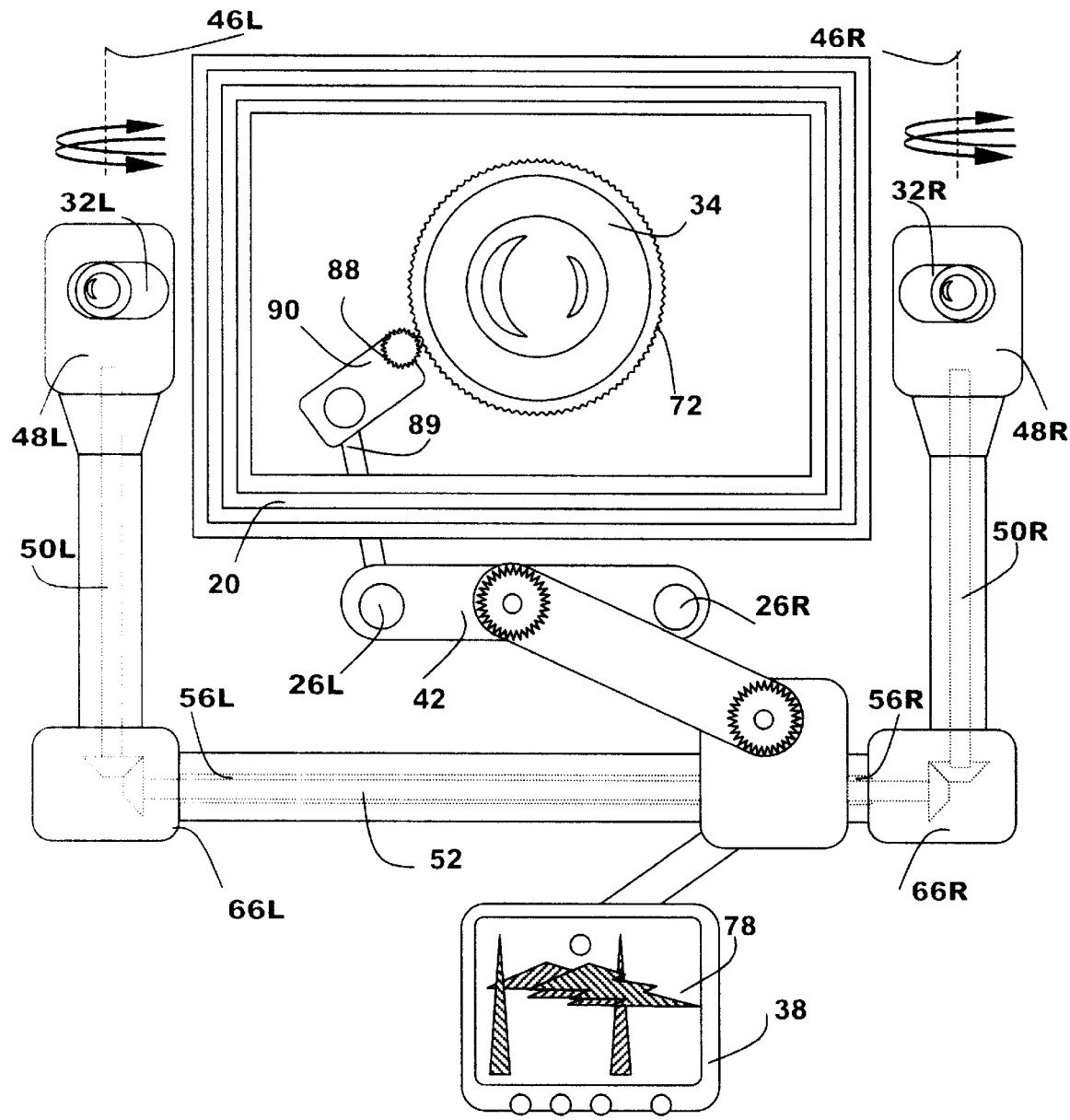
FIG. 3 is a schematic transverse sectional view of a motion picture camera showing an embodiment of the invention wherein the video cameras are mounted on each side of the motion picture camera.

Focus indicator 22 can preferably be selectively attached to the camera system in at least two orientations. In a first "horizontal" orientation video cameras 32 are on either side of lens 34. For this orientation, video cameras 32 may be suspended from above lens 34 as shown in the embodiment of FIG. 1, or may be supported from below lens 34 as shown in the embodiment of FIG. 3. In the second or "vertical" orientation video cameras 32 are located above and below lens 34.

Figure 4:
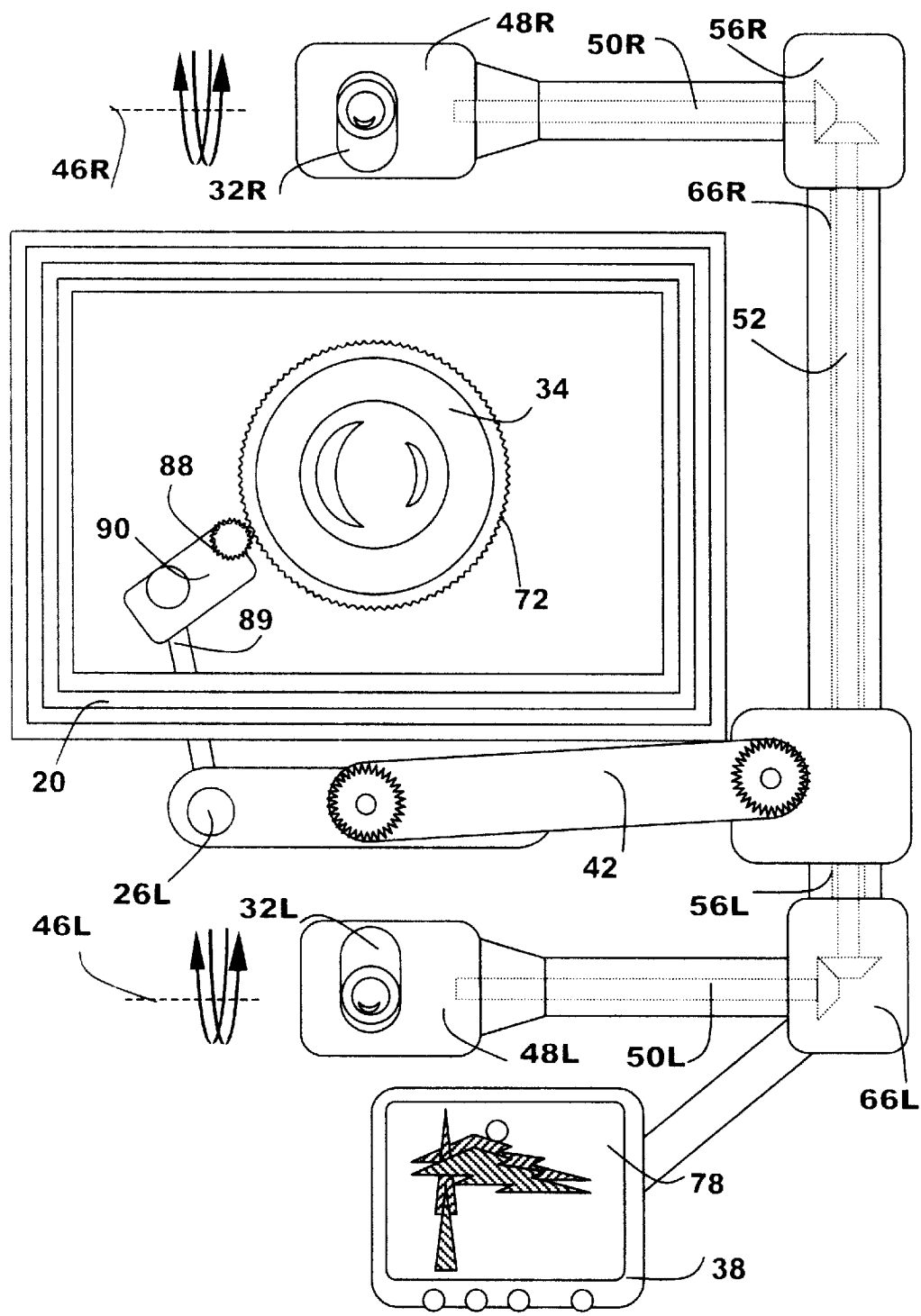
FIG. 4 is a schematic transverse sectional view showing an alternative embodiment of the invention wherein the video cameras are mounted above and below the motion picture camera.

In the embodiments of FIGS. 1–4, focus indicator 22 is secured to rods 26 by means of an L-shaped bracket 42 which is mounted on rods 26. Bracket 42 may be locked in position at a desired point on rods 26 by any suitable locking means. Focus indicator 22 is secured to bracket 42 with suitable fasteners so that focus indicator 22 can be mounted with video cameras 32 positioned on either side of lens 34 as seen in FIG. 3, or alternatively above and below lens 34 as best seen in FIG. 4. Positioning focus indicator 22 with video cameras 34 above and below lens 34 allows focus indicator 22 to be used in confined areas.

The position of video cameras 32 can be adjusted forwardly or rearwardly relative to matte box 20 by sliding bracket 42 forward or rearward on rods 26. Video cameras 32 are located on either side of lens 34. Preferably video cameras 32 are each located at a position between the front of matte box 20 and the film plane of camera 28. Video cameras 32 should be located so that they are not in the field of view of lens 34. Most preferably video cameras 32 are located symmetrically with respect to the center line L of lens 34. Most preferably the optical axes 70 of cameras 32 and center line L all lie in the same plane.

Video cameras 32R, 32L are pivotally mounted to focus indicator 22 so that they may be pivoted about axes 46L and 46R respectively in responses to changes in the focus of lens 34. Axes 46L and 46R are parallel to the film plane of camera 28. Shafts 50R, 50L are coupled by a cross shaft 52 (see FIG. 6). Video cameras 32 may be simultaneously rotated through equal angles but in opposite senses about axes 46R and 46L by rotating cross shaft 52. Cross shaft 52 rotates in response to changes in the focus distance of lens 34.

In the currently preferred embodiment of the invention video cameras 32R and 32L are respectively mounted to parallel shafts 50R, 50L. Most preferably video cameras 32 are each housed in a tubular case. In this preferred embodiment, the case of each video camera 32 is received in a tubular holder 48 on one of shafts 50R, 50L. Video cameras 32 can preferably be rotated in holders 48 so that the images produced by video cameras 32 remain upright when focus indicator 22 is moved from its first horizontal orientation (shown in FIG. 3) to its second vertical orientation (shown in FIG. 4). Detent mechanisms (not shown) may be provided in holders 48 and/or video cameras 32 so that video cameras 32 may be easily rotated in holders 48 into the correct orientation for use in upright or horizontal orientations.

Figure 6:
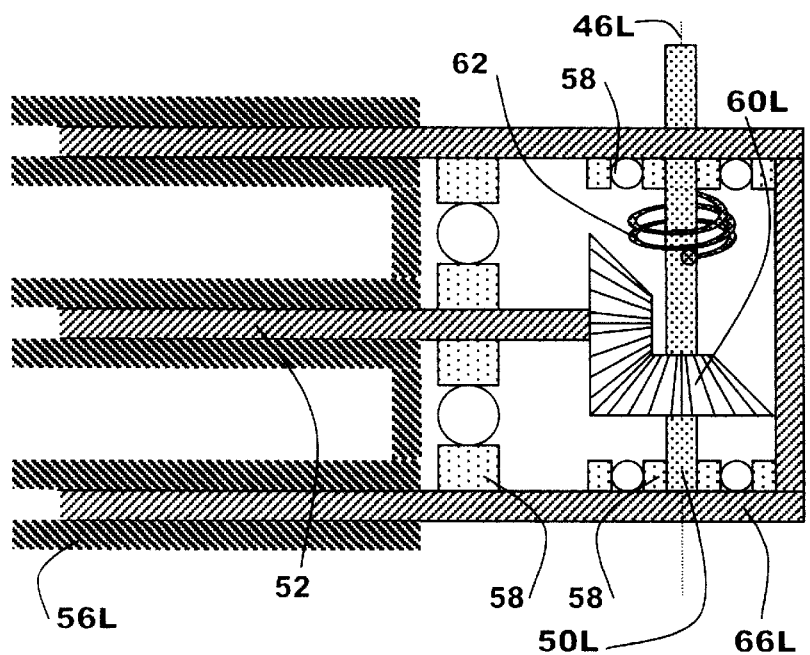
FIG. 6 is a front sectional view of the side motion couplings thereof.

As seen best in FIG. 6, cross shaft 52 passes through inner casings 56R, and is supported by bearings 58. Shaft 52 also passes through inner case 56L (not shown). Cross shaft 52 is coupled respectively to shafts 50R, 50L by angle drives, such as bevel gear assemblies 60R. Springs 62 are provided in bevel gear assemblies 60R and 60L (not shown) to take up any backlash so that video cameras 32 will rotate smoothly and synchronously.

Preferably the distance between video cameras 32 is adjustable. This may be accomplished, for example, by supporting shafts 50R, and S0L, from moveable housings 66R and 66L respectively. Housings 66R, 66L are slidably mounted in focus indicator 22 so that video cameras 32 may be slid together or apart and then fixed at a desired separation by locking housings 66R and 66L in place. When used with a typical motion picture camera 28, video cameras 32 are typically on the order of 14 to 20 inches apart. If the motion picture camera 28 is being used in a telephoto shot, a greater distance separating video cameras 32 may be preferable to achieve greater accuracy of focus.

Figure 9:
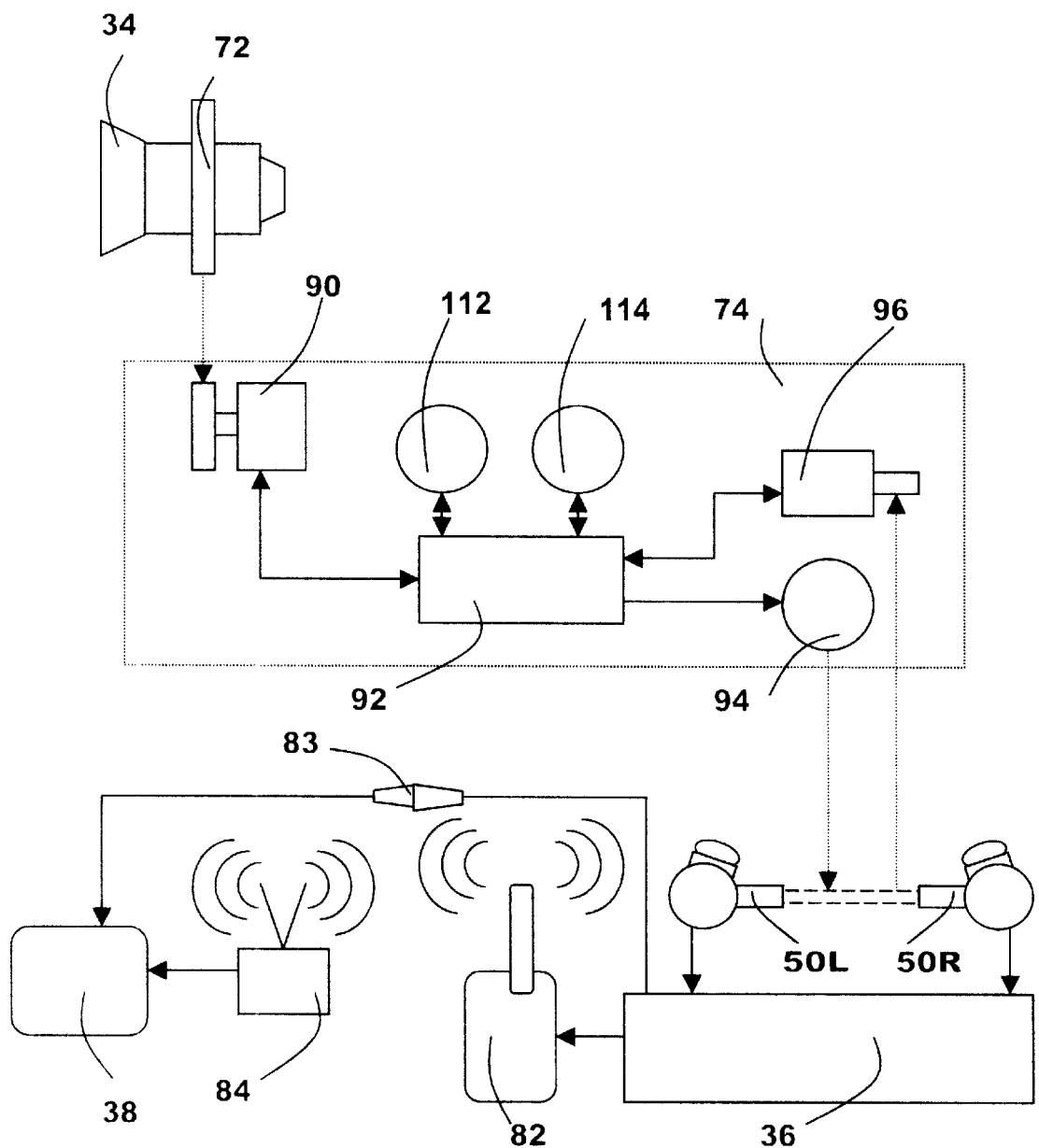
FIG. 9 is a block diagram of a focus indicator according to the invention.

Each video camera 32 has an optical axis 70. Cross shaft 52 is coupled to focus ring 72 of lens 34 by a coupling indicated generally by 74 (FIG. 9). Coupling 74 is preferably an electromechanical coupling. Coupling 74 operates so that optical axes 70 for video cameras 32 are both parallel to the axis L of lens 34 when focus ring 72 is adjusted for focus at infinity. When focus ring 72 is turned to focus lens 34 at another distance then coupling 74 operates to rotate video cameras 32 so that the optical axes 70 of video cameras 32 intersect on axis L at the distance on which lens 34 is focussed. This distance may be called the "focus distance" of lens 34.

Images from video cameras 32 are displayed simultaneously on monitor 38, such that the images from both of video cameras 32 are superimposed on monitor 38. As shown in FIGS. 7A, 7B, 8A and 8B a person viewing monitor 38 can tell whether a particular object is in focus or not by viewing monitor 38. If focus indicator 22 has been properly set up, as described below, and lens 34 is focused on an object then the image of that object taken by each of video cameras 32 will be in the same place on monitor 38. If the object is not in focus then the image of that object taken by one of video cameras 32 will be offset relative to the image of that object as taken by the other one of video cameras 32.

Figures 7A, 8A:
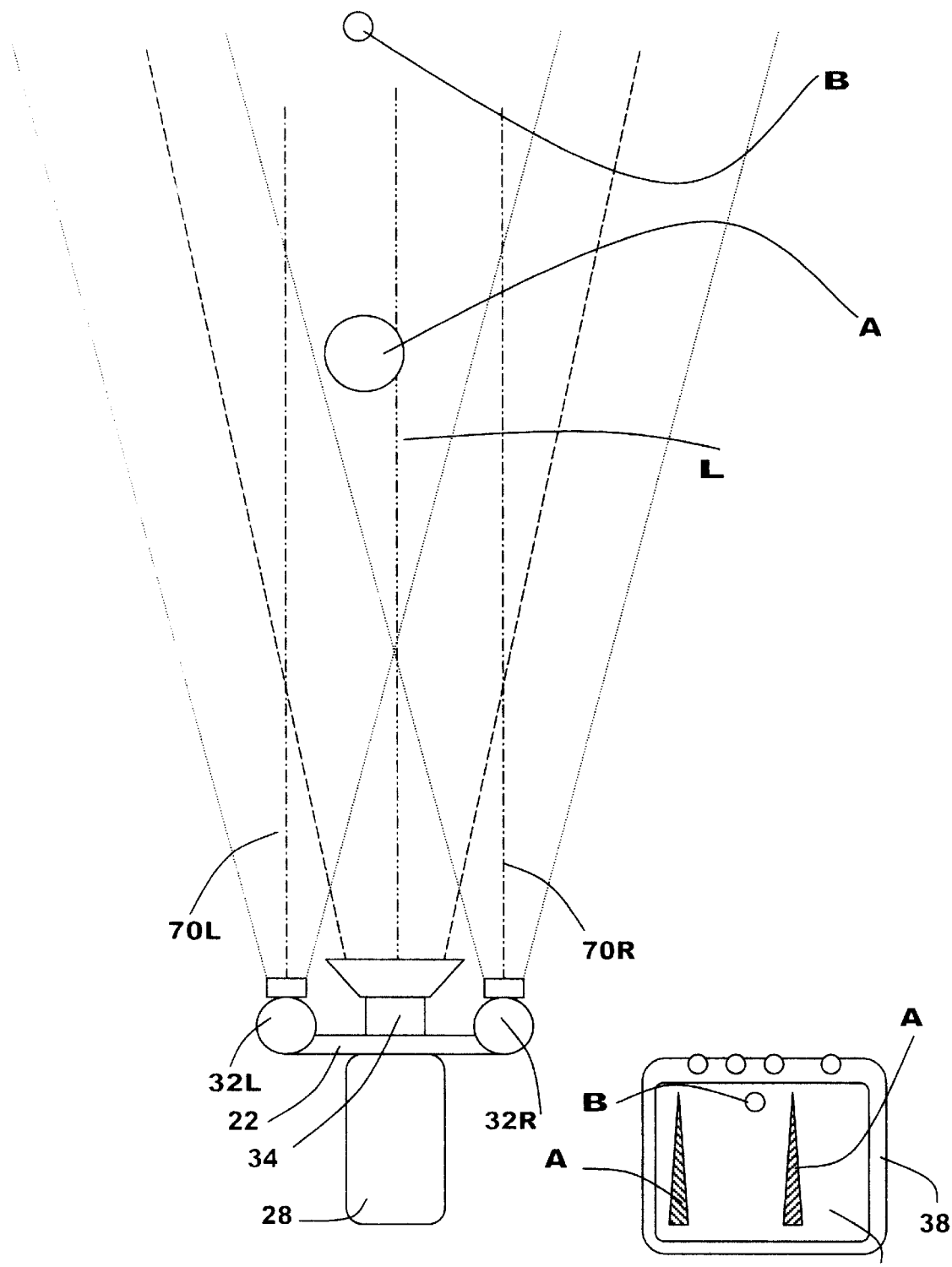
FIG. 7A is a top plan schematic view of a motion picture camera equipped with a focus indicator wherein the focus distance is set at less than infinity.
FIG. 8A is a view of a monitor screen of the focus indicator showing a first object which is in focus and a second object which is not in focus; and, FIG. 8B is a view of the monitor screen when the second object is in focus and the first object is not in focus.

For example, FIG. 8A shows the screen of monitor 38 when lens 34 is focused on a first object A. A second object B is located much farther away from lens 34 than object A. Object B is not in focus. It can be seen that monitor 38 displays two images of object B which are offset from one another. As shown in FIG. 7A, when lens 34 is focused on object A, video cameras 32 are spaced apart from one another and are each aimed in a different direction. Any object not at the focus distance of lens 34 will appear as a double object on monitor 38.

As seen in FIG. 8B, when focus ring 72 is rotated so as to focus lens 34 on object B which is located very far away from camera 28, then cameras 32 are rotated simultaneously and in opposite directions until their optical axes 70 are parallel with axis L, or nearly so (FIGS. 7A and 7B are not drawn to scale. In FIGS. 7A and 7B the distance between lens 34 and object B has been diminished to allow these Figures to be drawn in a reasonable size). After cameras 23 have been rotated then the images of object B produced on screen 78 of monitor 38 by each of cameras 32 will coincide with one another, as shown in FIG. 8B. The images of object A produced on monitor 38 by each of cameras 32 are no longer aligned with one another and produce a double image on monitor 38. The first assistant camera can thus tell from viewing monitor 38 that object B is in focus and object A is not in focus.

Figures 7C, 8C:
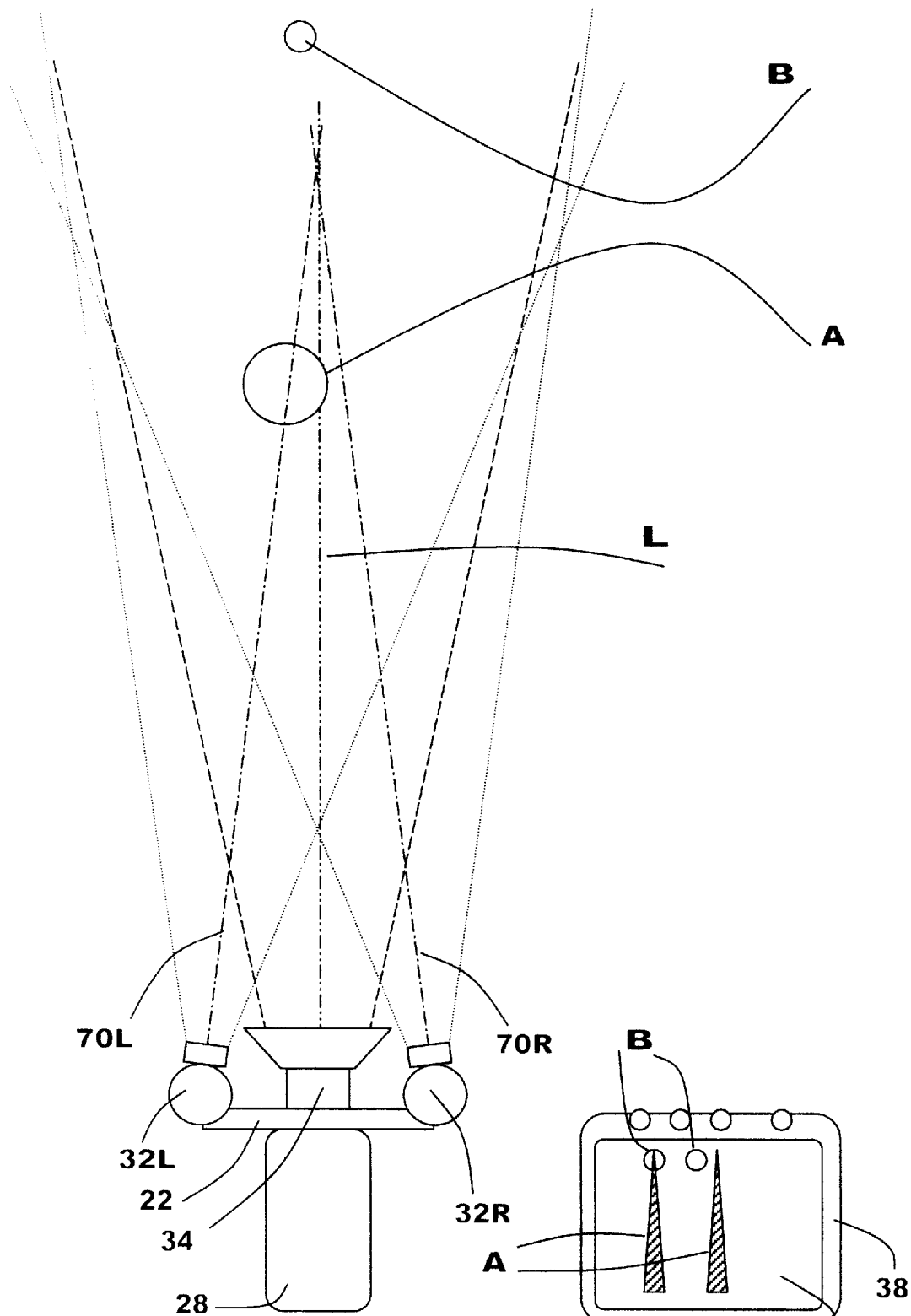
FIG. 7C is a top plan schematic view of a motion picture camera equipped with a focus indicator wherein the focus distance is set ⅓ of the distance between two objects beyond a nearer of the two objects.
FIG. 8C is a view of the monitor screen corresponding to the arrangement of FIG. 7C

Subsequently, when the lens 34 is focused on an intermediate position, both images of the two objects, A and B in FIG. 7C will be offset, as shown on the monitor's screen 78 in FIG. 8C.

Monitor 38 is located in a position where it can be easily viewed by the first assistant camera (who is responsible for focusing camera 28). For example, monitor 38 may be mounted to focus indicator 22 at a position above camera 28. In a preferred embodiment of the invention, monitor 38 is detachable from focus indicator 22. Where monitor 38 is detachable, monitor 38 may be connected to focus indicator 22 by a wire. Most preferably, however, focus indicator 22 includes a wireless video transmitter 82 which transmits an image for displaying on monitor 38 to a compatible receiver 84 built into monitor 38. When monitor 38 is connected to focus indicator 22 then the image for displaying on monitor 38 is conducted directly to monitor 38 by a suitable cable extending through a detachable connector 83 and transmitter 82 and receiver 84 are not active. Transmitter 82 and receiver 84 may be turned on automatically when monitor 38 is disconnected from focus indicator 22 or switches may be provided so that they may be manually turned on.

As it is desirable that focus indicator 22 can operate with standard unmodified lenses 34 it is generally desirable for focus indicator 22 to couple to the outer surface of focus ring 72. Most preferably, coupling 74 is an electromechanical coupling. Coupling 74 and the linkage 75 (FIG. 9) which includes cross shaft 52 together constitute control means connected to transducer 90 for counter rotating video cameras 32 in response to the output of transducer 90 so that the optical axes 70 of video cameras 32 cross at the focus distance of lens 34 (e.g. the distance in front of lens 34 at which lens 34 is focused).

In the preferred embodiment, which is illustrated in the drawings, coupling 74 comprises a gear 88 which meshes with teeth on the circumference of the focus ring 72. The focus rings 72 in most professional lenses have suitable teeth. Gear 88 is supported adjacent focus ring 72 by a suitable bracket indicated schematically at 89. Gear 88 is connected to an angular measurement transducer 90, which may, for example, be a control potentiometer, an optical encoder or the like. Transducer 90 generates or modifies an electrical signal in a way which varies with the position of focus ring 72. This signal is carried from transducer 90 to a control circuit 92.

Figure 5:
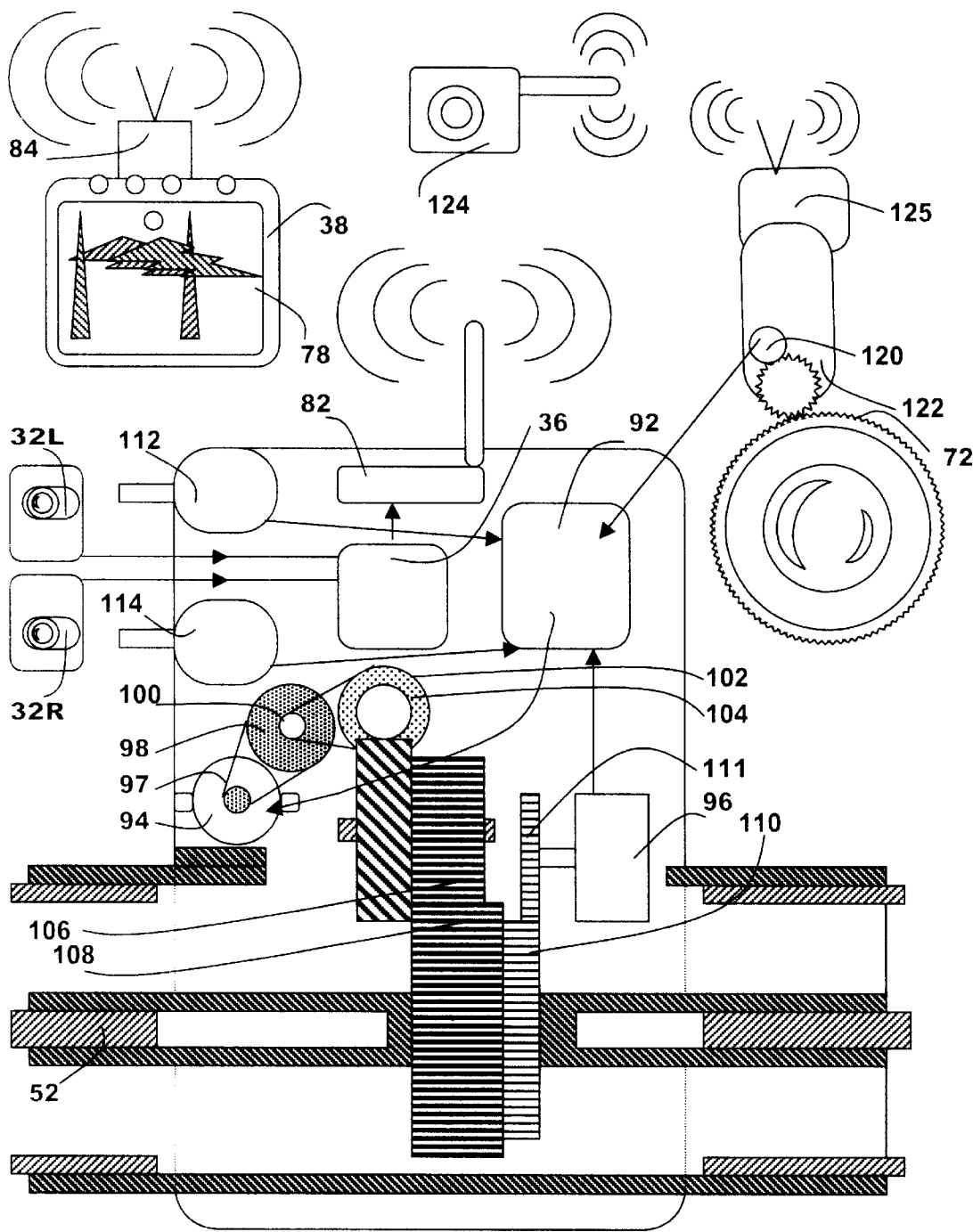
FIG. 5 is a side sectional view of the control box portion thereof.

Referring to FIGS. 5 and 9, control circuit 92 drives a motor 94 which rotates cross shaft 52 through the angle necessary to turn video cameras 32 so that their optical axes 70 cross at a distance in front of camera 28 where lens 34 is focused. In the illustrated embodiment, motor 94 turns cross shaft 52 through a step down drive train comprising pulleys 97, 98, 100, and 102, worm gear 104, and gears 106 and 108. Motor 94 may be, for example, a stepper motor a small direct current motor, or another actuator capable of rotating cross shaft 52 so as to pivot cameras 32 by a finely controlled amount.

Preferably a second transducer 96 is provided to detect directly when cross shaft 52 and video cameras 32 have rotated sufficiently. Control circuit 92 stops the rotation of video cameras 32 when second transducer 96 indicates that they are positioned so that they are aimed with their optical axes 70 crossing at the focus distance of lens 34. In the illustrated embodiment second transducer 96 is coupled to cross shaft 52 by gears 110 and 111.

Preferably control circuit 92 comprises a microprocessor which calculates the angle through which to rotate cross shaft 52 from the electrical signal provided by transducer 90 and operates motor 94 accordingly. Preferably the output of second transducer 96 is compared to a desired valve calculated by control circuit 92 to provide direct feedback as to the angle of rotation of cross shaft 52.

Coupling 74 must be adjustable because, for different lenses 34, the range of rotation of focus ring 72 can differ. Furthermore, the closest possible focus distance is different for different lenses. In the preferred embodiment of the invention, control circuit 92 comprises a control 112 which can be used to adjust the amount of rotation of video cameras 32 produced by a given input from transducer 90. Preferably a second control 114 is provided to adjust the offset of the image provided by camera 32L relative to the image provided by camera 32R by turning shaft 52 slightly.

Focus indicator 22 is prepared for use by mounting a desired lens 34 on camera 28 and adjusting the separation distance of video cameras 32 to match the lens and shooting conditions. If lens 34 is a wide angle lens or if the shooting location is very cramped then cameras 32 will typically be positioned close to one another. If lens 34 is a telephoto lens then video cameras 32 will generally be positioned farther apart to provide better accuracy. The first assistant camera can ensure the distance from each video camera 32 to the motion picture camera 28 remains equal by using distances marked on inner casings 56R, 56L. Alternatively video cameras 32 may be coupled so that they move in and out together relative to motion picture camera 28. This may be accomplished, for example, through the use of a rack and pinion system (not shown) or the like.

The first assistant camera next adjusts the zoom of both of video cameras 32 so that the images displayed on monitor 38 are of similar size and perspective to the field of view through lens 34 of camera 28. A single control may be provided to simultaneously zoom each of video cameras 32 so that both cameras 32 will always have the same zoom setting. Next the first assistant camera sets focus ring 72 to focus lens 34 at infinity and sets camera 28 to view a distant object. After this has been done, video cameras 32R, 32L are each set with their optical axes 70 parallel to axis L of lens 34. Control 114 is used to superimpose the two images of the distant object on monitor 38.

Figure 10:
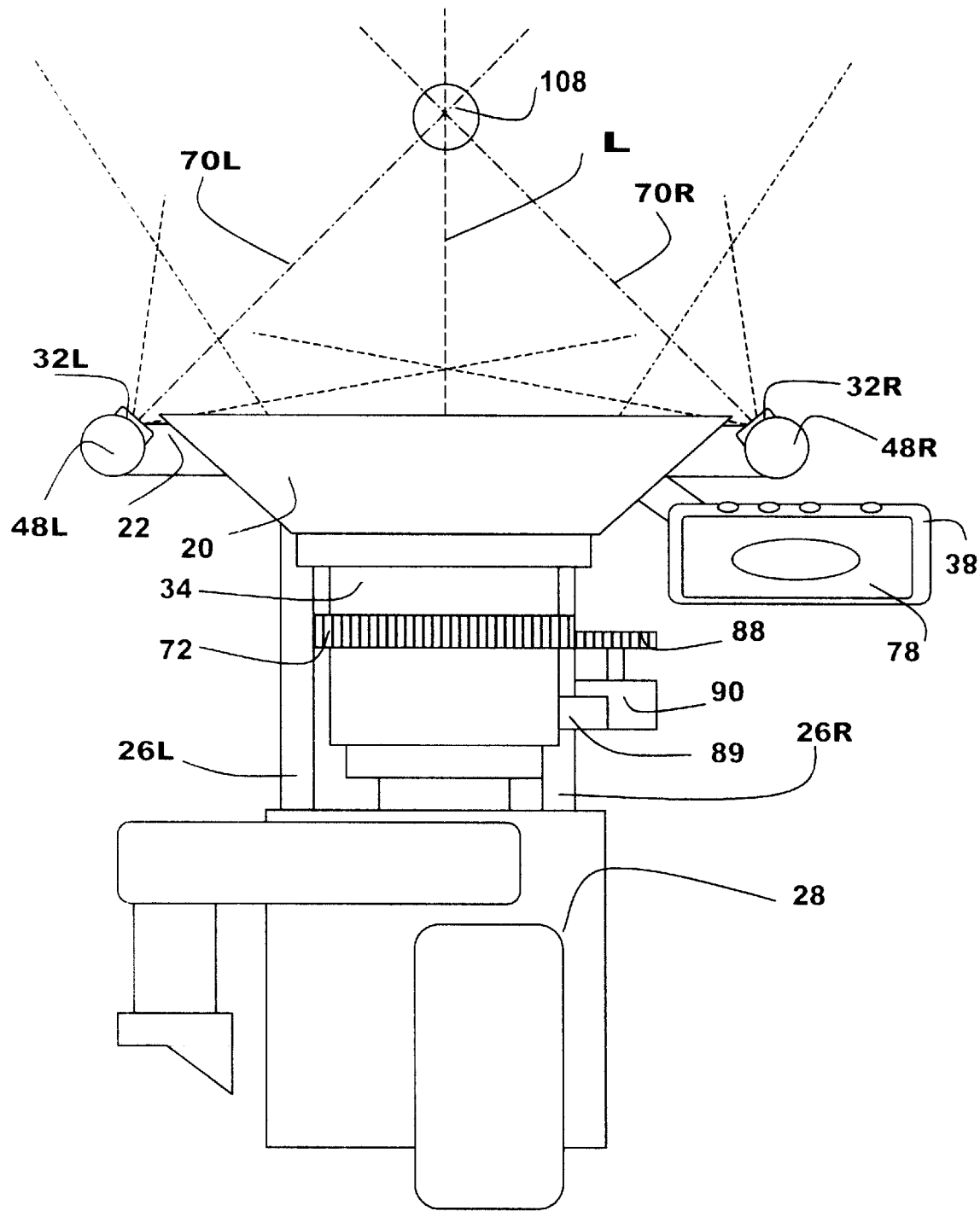
FIG. 10 is a top plan schematic view of a motion picture camera equipped with a focus indicator according to the invention in use

After this has been done, transducer 90 is set to its position representing focus at infinity and gear 88 is meshed with the teeth on focus ring 72. Next, the first assistant camera rotates focus ring 72 so that lens 34 is focused at its minimum focus distance on an object 118 (FIG. 10) which is located in front of camera 28 on line L. The first assistant camera manipulates control 112 to cause control circuit 92 to turn video cameras 32 so that the two images of object 118 are superimposed on display 38. After this has been done, control circuit 92 will automatically pivot video cameras 32 by equal amounts, in opposite senses, in response to changes in the position of focus ring 72 so that the optical axes 70 of cameras 32 cross at the distance in front of lens 34 at which lens 34 is focused.

It can be appreciated that the adjustability of coupling 74 allows the use of focus indicator 22 with a wide variety of lenses commonly used in the motion picture industry. No modifications to the lenses are necessary as long as they are equipped with focus rings capable of being engaged by gear 88 or otherwise coupled to transducer 90.

After focus indicator 22 has been calibrated for the lens 34 being used, as explained above, the first assistant camera will continue to adjust the focus of lens 34 by manually rotating focus ring 72 or by operating a transducer 120 coupled to a servo 122 which, in turn, is coupled to focus ring 72 through a wireless transmitter 124 and receiver 125 to remotely manipulate focus ring 72 (see FIG. 9). As this is done, video cameras 32R, 32L will automatically pivot, as described above. The first assistant camera can see immediately by viewing screen 78 what objects in the field of view of lens 34 are in precise focus.

The ease with which the first assistant camera can determine where the focus of camera 28 is at any particular time greatly improves the speed and efficiency with which the first assistant camera can maintain focus in a situation where the distance from camera 28 to the object of the shot changes rapidly. The precision with which focus indicator 22 permits a lens 34 to be focussed in low light conditions can permit shooting with a larger aperture (and therefore a smaller depth of field) than would otherwise be possible. This, in turn, can reduce or eliminate the need for supplementary illumination systems in some cases.

As will be apparent to those skilled in the art in the light of the foregoing disclosure, many alterations and modifications are possible in the practice of this invention without departing from the spirit or scope thereof. For example, it will be readily apparent to those skilled in the art that other equivalent systems may be provided to cause video cameras 32 to pivot in opposite directions about parallel axes 46L and 46R as the focus of lens 34 is changed. For example, a separate motor may be provided to rotate each of video cameras 32 under the control of control circuit 92. Control circuit 92 may take many forms using known circuit elements. The mechanism for allowing the spacing between video cameras 32 to be adjusted may also be varied without departing from the invention. While it is not preferred, the spacing between cameras 32 may be fixed. While the connection between transducer 90 and control circuit 92 has been described as an electrical connection, the connection could comprise an optical link instead. While motor 94 has been illustrated as a rotary motor, motor 94 could comprise one or more linear actuators or the like suitably linked to counter rotate video cameras 32. A second transducer 96 may not be needed if the angles of cameras 32 can be precisely determined from the inputs to motor 94. Those skilled in the art will realize that many other modifications and alterations may be made without departing from the broad scope of this invention.

Figure 11:
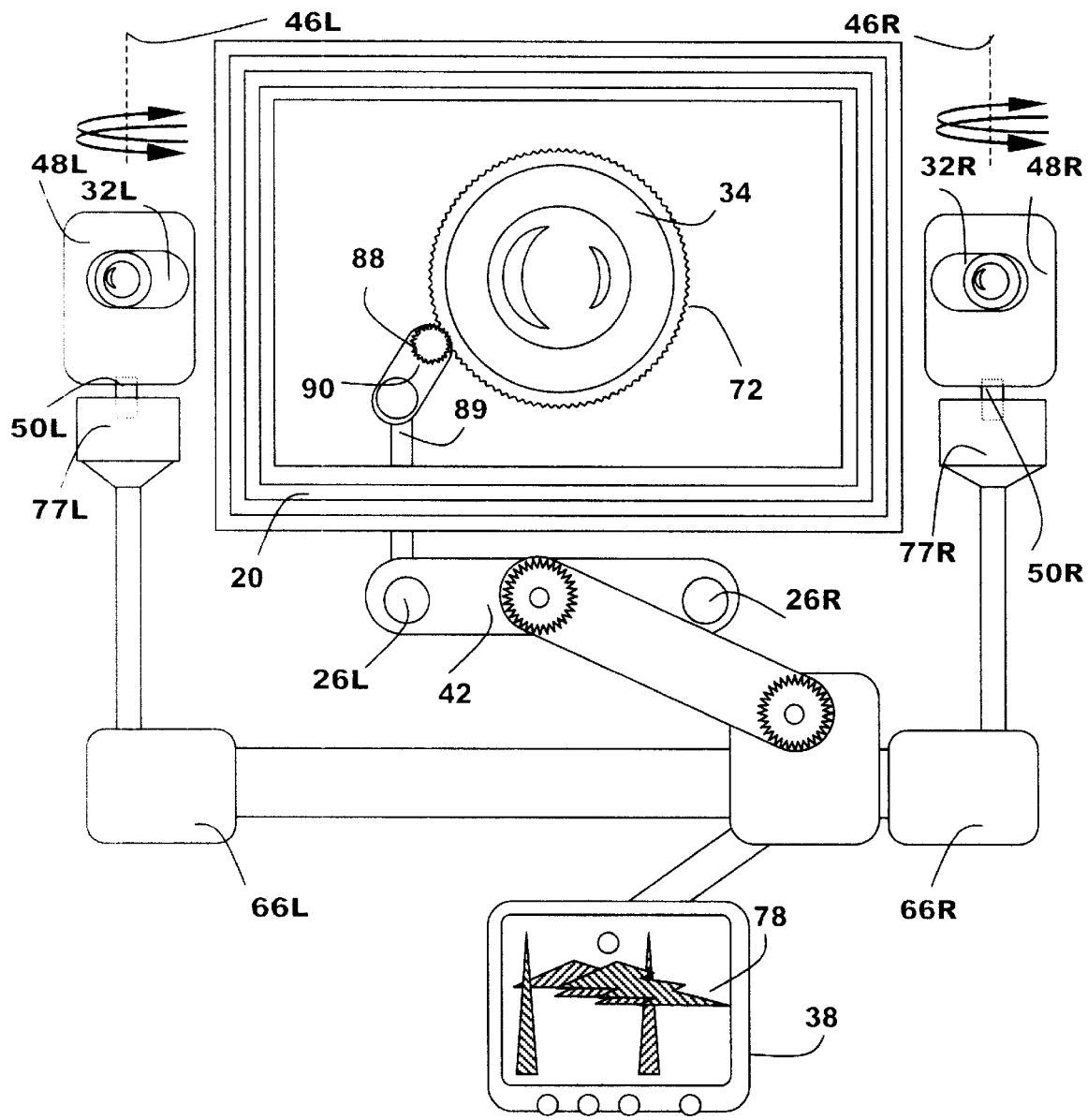
FIG. 11 is a side sectional view of an alternative embodiment of the control box which includes a pair of servo motors.

Referring to FIG. 11, there is shown an alternative schematic of the control box with a pair of servo motors 77R and 77L which drive shafts 50R and 50L, respectively. This avoids the need for a cross shaft such as cross shaft 52 shown in FIGS. 5 and 9 but requires suitable synchronization between each of the two servo motors and the transducer 90.

Accordingly, the scope of the invention is to be construed in accordance with the substance defined by the following claims.

What is claimed is:

1. A focus indicator system for a motion picture camera, to operate in conjunction and display the focus of a lens of said camera, the focus indicator system comprising:
   (a) first and second video cameras pivotally mounted at spaced apart locations diametral opposite said lens for counter rotation about parallel first and second axes respectively, the first and second video cameras having optical axes which cross one another at a crossing point on the optical axes of the lens of said motion picture camera;
   (b) operative means to receive and display simultaneously first and second images as seen by the first and respectively second video cameras in superimposed relation to one another;
   (c) attaching means to attach said first and second video cameras to said motion picture camera, wherein said first and second video cameras maybe adjustably movable toward and away from one another;
wherein the first and second video cameras are coupled by a focus coupling to a focus ring on said lens and the first and second video cameras are operative to counter rotate in response to rotation of the focus ring so as to maintain the crossing point at a distance in front of the lens equal to a distance at which the lens of the motion picture camera is focussed.

2. The focus indicator system of claim 1, wherein said attaching means includes a frame attached to said motion picture camera, the first and second video cameras being mounted to said frame with said first video camera on one side and said second video camera on a second side of said motion picture camera opposite to said first side.

3. The focus indicator system of claim 1, further including a transducer coupled to said focus ring and wherein the focus coupling comprises a control circuit to receive signals from the transducer, the signals indicative of the amount of movement of said focus ring; and including a motor assembly operative to counter rotate said first and second video cameras in response to signals from said control circuit.

4. The focus indicator system of claim 2, wherein the operative means includes a video receiver, a wireless video transmitter, a wireless video transmitter, and a monitor.

5. The focus indicator system of claim 2, wherein said frame is selectively mountable reversibly movable relative to said motion picture camera to a position in which the first and second video camera are respectively above and below the primary camera, to the left or right of the primary camera, or in any other intermediate position.

6. The focus indicator system of claim 3, further including a linkage coupled to the motor and to said first and second video cameras having a cross shaft driven by the motor and each video camera being mounted on an axis extending perpendicularly to and coupled to the cross shaft.

7. The focus indicator system of claim 4, wherein the monitor is detachably mounted to the frame.

8. The focus indicator system of claim 1, wherein the first and second video cameras each comprise a zoom lens.

9. The focus indicator system of claim 8, further including a control system to simultaneously zoom both the first and second video cameras in and out.

10. The focus indicator system of claim 5, wherein the first and second video cameras are each rotatable parallel to the optical axis between a position wherein the first and second images are upright when the first and second video camera are in a first orientation and a position wherein the first and second images are upright when the first and second video cameras are in a second orientation at a right angle to the first orientation.

* * * * *